(12) United States Patent
Basham et al.

(10) Patent No.: US 6,850,380 B2
(45) Date of Patent: Feb. 1, 2005

(54) STACKABLE CONNECTOR SYSTEM FOR AUTOMATED REMOVAL/ADDITION IN A STORAGE MEDIA LIBRARY

(75) Inventors: Robert Beverley Basham, Aloha, OR (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 10/211,633

(22) Filed: Aug. 2, 2002

(65) Prior Publication Data

US 2004/0021973 A1 Feb. 5, 2004

(51) Int. Cl.[7] .............................................. G11B 19/02
(52) U.S. Cl. ...................................................... 360/69
(58) Field of Search ..................... 360/69, 31; 414/932; 700/213, 214; 361/685; 439/262, 267; 369/53.1

(56) References Cited

U.S. PATENT DOCUMENTS

| | | | |
|---|---|---|---|
| 4,384,755 A | 5/1983 | Perretta ..................... 339/18 R |
| 5,239,445 A | 8/1993 | Parks et al. .................. 361/729 |
| 5,336,109 A | 8/1994 | Hillbish et al. .............. 439/540 |
| 5,967,803 A | 10/1999 | Ho ............................... 439/79 |
| 5,986,880 A | 11/1999 | Santeler et al. ............. 361/684 |
| 6,053,772 A | 4/2000 | Aizawa et al. .............. 439/607 |
| 6,710,962 B1 * | 3/2004 | Caverly et al. ............... 360/69 |

FOREIGN PATENT DOCUMENTS

JP  02-299188  5/1989  ........... H01R/43/00

* cited by examiner

*Primary Examiner*—Sinh Tran
*Assistant Examiner*—Mitchell Slavitt

(57) ABSTRACT

An automated data storage library includes a plurality of storage slots, a drive having a stacked connector system, and a library control manager configured to monitor usage data for the stacked connector system representative of the number of times the stacked connector system is mounted by a media connector from any of a plurality of media elements, and wherein the library manager is further configured to coordinate refreshment of the stacked connector system when the usage data reaches a predetermined usage level threshold. The stacked connector system may be refreshed by replacement or addition of a separate connector. Various methods of improving the long term performance of a drive in a media library by replacing or adding a connector to a stacked connector system of a drive are also provided.

21 Claims, 5 Drawing Sheets

STACKABLE CONNECTOR SYSTEM FOR AUTOMATED REMOVAL/ADDITION IN A STORAGE MEDIA LIBRARY

FIELD OF THE INVENTION

This invention relates to automated data storage libraries for storing and retrieving data storage media elements, and more particularly, to a stackable connector system on a drive that is configured to be automatically refreshed.

BACKGROUND OF THE INVENTION

Automated data storage libraries are known for providing cost effective access to large quantities of stored data. Such systems typically include an array of storage slots to hold various storage media elements or cartridges such as magnetic tape cartridges or cassettes, and a controllable accessor for transporting a desired storage media element between its storage slot and an appropriate drive. The drive is capable of reading and/or writing data to the data storage media element. The drive and storage media elements may each be provided with a multi-pin connector that are mated together when a storage media element is brought to the drive by the accessor.

The ratio of storage media elements to a drive is typically a large number. For example, one exemplary tape library may have 1,000 storage media elements and six drives, or an average ratio of about 167 storage media elements per each drive. The multi-pin connector on the drive and each of the connectors on the media storage elements each have a predetermined usage level threshold over which each connector is more prone to failure. For example, each connector may be more prone to failure over 10,000 cycles, where a cycle is the coupling and decoupling of one connector with another.

Given the large ratio of storage media elements to the drive, the connector on the drive is typically the first to wear out. As such, the drive connector is a limiting factor in mean load between failure times for an automated data storage library. Accordingly, there is a need in the art for a drive connector apparatus and method that overcomes the above deficiencies in the prior art by providing a stackable connector system on the drive that is configured to be automatically refreshed after a predetermined usage level of the mating side of the stackable connector system is reached or a predetermined time level is expired.

BRIEF SUMMARY OF THE INVENTION

An automated data storage library consistent with the invention includes: a plurality of storage slots; a drive having a stacked connector system; a plurality of data storage media elements stored in at least some of the plurality of storage slots, wherein each of the plurality of data storage media elements has a media connector; an accessor configured to transport the data storage media elements between the storage slots and the drive; and a library control manager coupled to the drive and to the accessor, wherein the library control manager is configured to monitor usage data for the stacked connector system representative of the number of times the stacked connector system is mounted by any of the media connectors from any of the plurality of media elements, and wherein the library manager is further configured to coordinate refreshment of the stacked connector system when the usage data reaches a predetermined usage level threshold.

In one embodiment, the stacked connector system may include an interior connector fixed to the drive and an exterior connector coupled to the interior connector, wherein the exterior connector is replaced once it reaches a predetermined usage level to refresh the stacked connector system.

A method of improving the long term performance of a drive in a media library, wherein the drive has a first connector having a first predetermined usage level, consistent with the invention includes the steps of: coupling a second connector, having a second predetermined threshold usage level, to the first connector; monitoring usage data of the second connector; and replacing the second connector with a third connector having a third predetermined usage level once the usage data for the second connector reaches the second predetermined usage level.

Another method of improving the long term performance of a drive in a media library, wherein the drive has a first connector with a first predetermined usage level, consistent with the invention includes the steps of: monitoring usage data of the first connector; and coupling a second connector having a second predetermined usage level to the first connector once the usage data for the first connector reaches the first predetermined usage level.

Another method of improving the long term performance of a drive in a media library consistent with the invention includes the steps of: monitoring the number of times a media connector of a storage media element is mounted to a connector of the drive; and replacing the connector once the number of mounts reaches a predetermined usage level over which the connector is more prone to failure.

Another automated data storage library consistent with the invention includes: a plurality of storage slots; a drive having a stacked connector system; a plurality of data storage media elements stored in at least some of the plurality of storage slots, wherein each of the plurality of data storage media elements has a media connector; an accessor configured to transport the data storage media elements between the storage slots and the drive; and a library control manager coupled to the drive and to the accessor, wherein the library control manager is configured to coordinate refreshment of said stacked connector system after a predetermined time interval.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
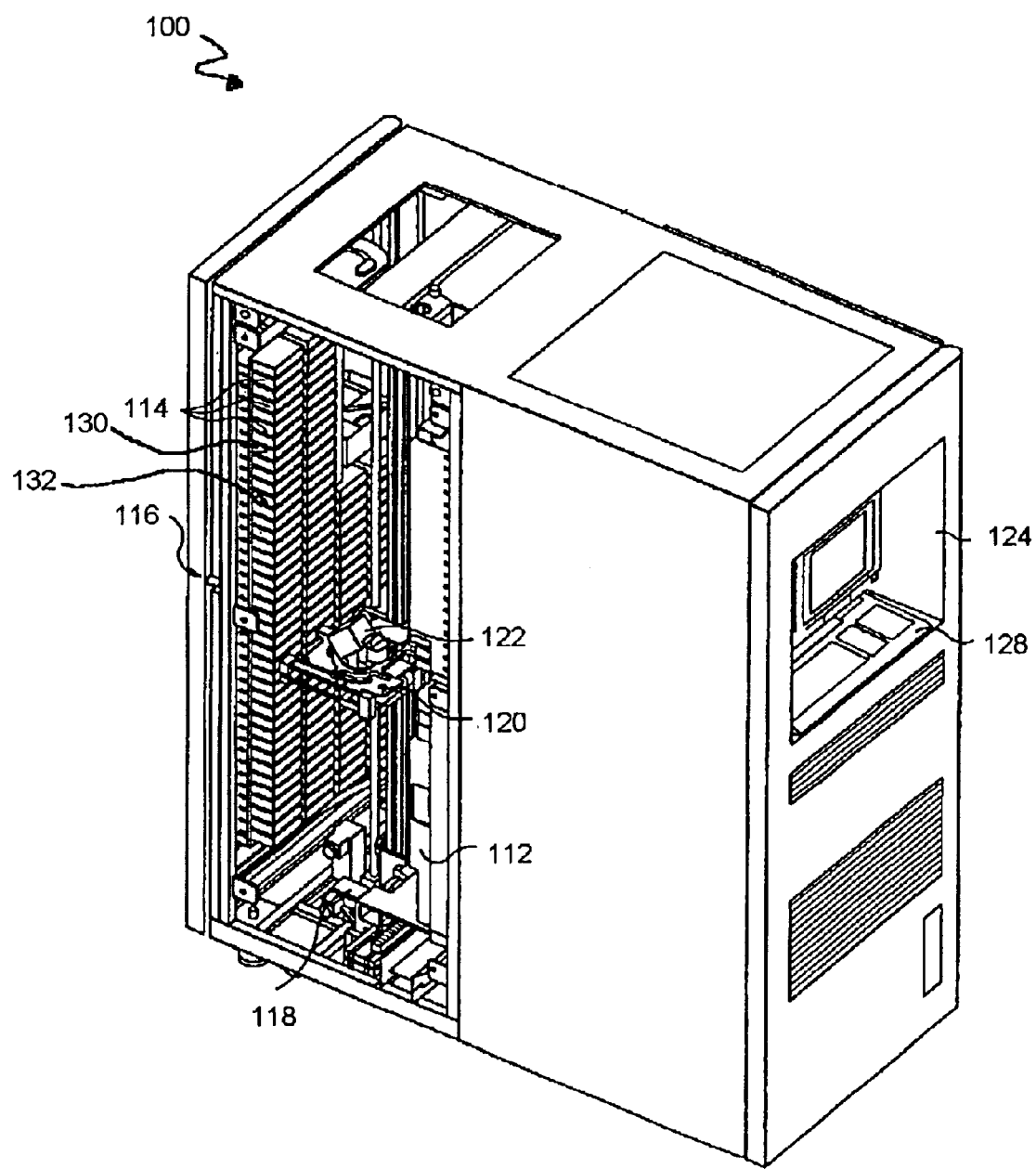
FIG. 1 is perspective view of an automated data storage library consistent with the invention.
Figure 2:
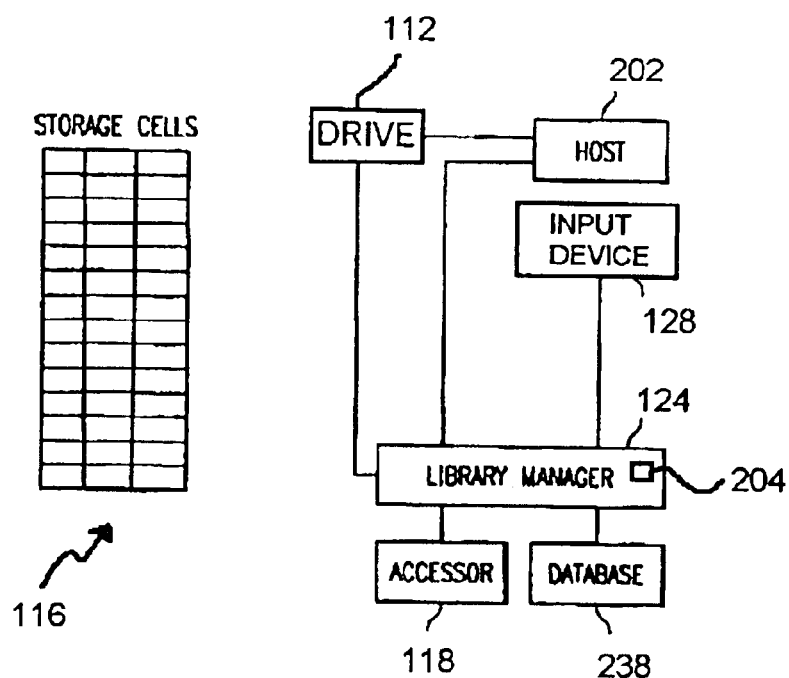
FIG. 2 is a block diagram of the automated data storage library of FIG. 1.

Turning to FIG. 1 and FIG. 2, a perspective view and a corresponding block diagram of an exemplary automated data storage library 100 for storing and accessing removable data storage media elements 116 is illustrated. The library 100 may include a drive 112, removable data storage media elements 114, e.g., media cartridge, stored in a plurality of storage slots 116, an accessor 118, and a library manager 124. Even though only one drive 112 is illustrated, those skilled in the art will recognize that a plurality of drives may be provided in a library 100 consistent with the invention.

The accessor 118 is configured to transport a selected storage media element 114 between a storage slot 116 and the drive 112. A variety of devices known to those skilled in the art such as a gripper 120 and bar code scanner 122 may also be utilized to assist the accessor 118 in securing and identifying storage media elements. The storage media element 114 may contain any type of media such as optical or magnetic media, where both the drive and storage media elements are equipped with a mating connector. A special connector-removal media element 130 and connector-insertion media element 132, as later described herein, may also be stored in the storage slots 116.

The library manager 124, which includes at least one processor 204, is interconnected with and controls the actions of the drive 112 and the accessor 108. The library manager 124 may also be coupled to an input device 128 such as a keyboard, and the library manager may also be interconnected through a provided interface to one or more host processors 202. Data access commands and information to be recorded on, or to be read from, selected storage media elements 114 may be transmitted directly between the drive 112 and the host 202. The library manager 124 may also be provided with a database 238 which includes storage, e.g., typically one or more hard disk drives, for tables and programs.

Figure 3:
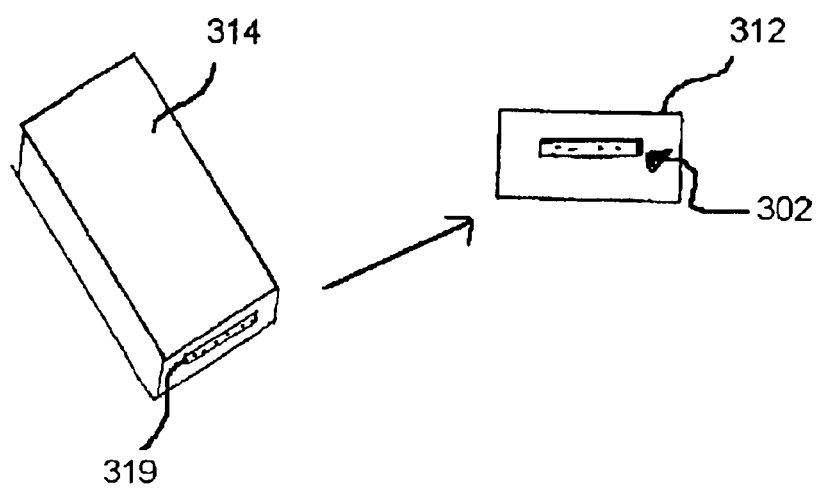
FIG. 3 is a perspective view of a media storage element and drive illustrating the connectors for each.

Turning to FIG. 3, a perspective view of a media storage element 314 for coupling to a drive 312 is illustrated. Each media storage element 314 has an associated media connector 319. The media connector 319 is typically a multi-pin connector but may be any variety of connector. When a particular media storage element 314 is transported by the accessor 118 to the drive 312, the media connector 319 is advantageously configured to mate with the stacked connector system 302 of the drive 312 as detailed further herein. The stacked connector system 302 is configured to refresh when its mating side reaches a predetermined usage level threshold, e.g., 10,000 cycles. For instance, as this predetermined usage level threshold is reached, the exterior mating side of the stacked connector system 302 may be replaced, or alternatively added to, as an automatic function of the library 100 in which the drive 112 is housed. As such, the stackable connector system 302 can continue to operate with a lower likelihood of connector failure to increase the drive's 112 effective mean load between failure rating. Alternatively, the stacked connector system 302 may be configured to refresh after a predetermined time interval as opposed to a predetermined usage level.

Figure 4A:
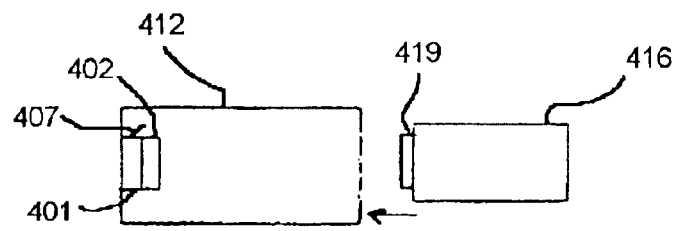
FIGS. 4A–4C are cutaway perspective views of a drive and storage media elements consistent with the invention illustrating replacement of an exterior connector of a stacked connector system on the drive.
Figure 4B:
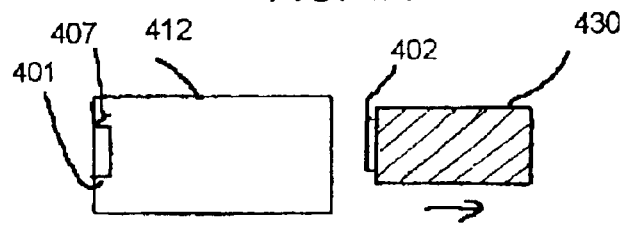
Figure 4C:
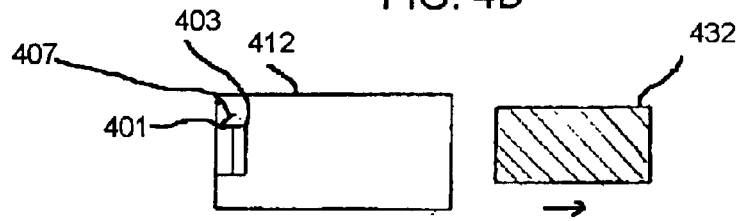

Turning to FIGS. 4A through 4C, a preferred embodiment is illustrated where the stacked connector system is refreshed by replacing an exterior connector of the connector system. As illustrated in FIG. 4A, an exterior connector 402 is coupled to an interior connector 401 which make up the stacked connector system of FIG. 4A. As such, the exterior connector 402 mates with various media connectors 419 from various data storage media elements 416 as the accessor 118 transports such elements to and from the drive 412 based on instructions from the library manager 124.

Each exterior connector such as connector 402 has an expired and unexpired state depending on the number of times the connector has been used. The expired state occurs when the connector 402 has been mounted and dismounted, e.g., one cycle, by a media connector 419 from a particular data storage media element 416 more than a predetermined number of times associated with that particular exterior connector. Over this usage level, the connector is more prone to failure.

To accomplish monitoring of a connector's state, the library manager 124 may monitor the number of times any one of the plurality of data storage media elements 416 is mounted and removed from the drive 412. A table indicative of the number of cycles or the number or mounts may then be stored in the database 238, which is accessible to the library manager 124.

A predetermined usage level threshold, e.g., 10,000 cycles, for a particular exterior connector, e.g., connector 402, may also be stored in such a table and compared to the monitored usage. Once the number of cycles for an associated exterior connector reaches its associated predetermined threshold level for that particular connector, i.e., that particular connector 402 reaches its expired state where it is more prone to failure, the library manager 124 may automatically trigger a removal and replacement process for the connector 402.

Turning to FIGS. 4B and 4C, an exemplary apparatus and method of removing and replacing an exterior connector is illustrated. Once the exterior connector 402 reaches its expired state as above detailed, the library manager 124 instructs the accessor 118 to transport a special connector-removal media element 430 from its storage slot to the drive 412. The connector-removal media element 430 is configured to mate with the exterior connector 402 of the drive 412 and to disengage the exterior connector 402 from the interior connector 401. The interior connector 401 may be equipped with an unlocking mechanism 407, e.g. plastic tabs, that is responsive to the connector-removal media element 430 enabling it to disengage the locking mechanism to remove the connector 402.

Once the exterior connector 402 is disengaged, the connector-removal media element 430 secures the connector 402 and the accessor 118 transports the connector-removal media element 430 and expired connector 402 back to a storage slot. The connector-removal media element 430 may be configured to hold a number of expired exterior connectors, which may then be discarded once the connector-removal media element reaches a full condition. The media library may be further equipped with an alarm, e.g., an audio or visual alarm, to alert a user that it is time to empty the expired connectors from the connector-removal media element.

As illustrated in FIG. 4C, once the expired exterior connector 402 is removed, the accessor 118 then transports a connector-insertion media element 432, which is configured to hold one or more unexpired exterior connectors, e.g., unexpired exterior connector 403, from its storage slot to the drive 412. The connector-insertion media element 432 is configured to allow the locking mechanism 407 on the interior connector 401 to retain the unexpired exterior connector 403. As such, an unexpired exterior connector 403 is now inserted on the interior connector 401. The number of cycles or mounts in the database 238 may then be reset and a separate predetermined usage level for the unexpired exterior connector 403 may be stored in the database 238 for comparison to monitored usage levels. This process continues until the interior connector 401 reaches its predetermined usage level threshold from the replacement of the exterior connectors.

As such, there is a multiplying effect between the interior connector 401 and each exterior connector to substantially increase the performance of such drives 412 to make them more competitive with other drives that do not have a plurality of media cartridges being repeatedly mounted and dismounted. For example, assume the interior connector 401 has a threshold rating of 10,000 cycles and each of the replaceable exterior connectors, e.g., connectors 402, 403, etc., that are removed and replaced each have a threshold rating of 10,000 cycles. After the first 10,000 cycles, the expired exterior connector 402 is removed from the interior connector 401 and an unexpired connector 403 is added to the fixed connector. The interior connector 401 thus went through one cycle. After the next 10,000 cycles, the then expired exterior connector 403 is removed and yet another unexpired exterior connector is added. The interior connector 401 thus went through two cycles. This process continues as such and the effective overall mean load between failure (MLBF) is effectively 100 million cycles in this example (10,000 cycles of the interior connector time 10,000 cycles for each of the 10,000 replaceable exterior connectors).

Figure 5A:
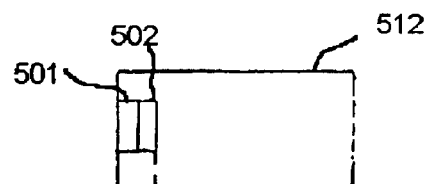
FIGS. 5A–5C are cutaway perspective views of a drive consistent with the invention illustrating the addition of exterior connectors on a stacked connector system while maintaining an interior connector in a fixed position.
Figure 5B:
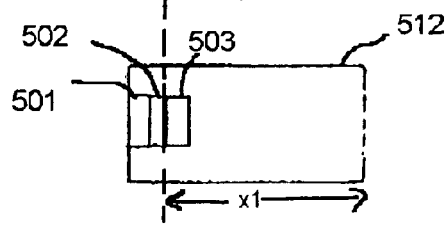
Figure 5C:
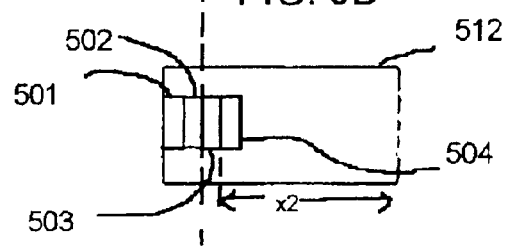

Turning to FIGS. 5A–5C, an alternative embodiment consistent with the invention is illustrated where the stacked connector system is refreshed by adding, not replacing, exterior connectors. This embodiment also has the multiplying effect between the interior connector and exterior connectors as previously detailed. As illustrated, once the exterior connector 502 reaches its expired state as earlier detailed, an unexpired exterior connector 503 is added or stacked onto the original exterior connector 502 while the interior connector 501 remains in a fixed position relative to the drive 512. Since the connector 502 is not removed, the accessor 118 should be configured to handle different storage media element loading and unloading distances.

For example, FIGS. 5B and 5C illustrate varying distances the accessor has to handle. As illustrated in FIG. 5B, the accessor 118 has to move a data storage media element a distance x1 from the entrance of the drive 512 to the mating surface of the exterior connector 502. However, when another exterior connector 503 is added to the stack, the accessor has to move a data storage media element a distance x2 from the entrance of the drive 512 to the mating surface of the exterior connector 503. The distance x1 is greater than the distance x2 by an amount equal to the width of the connector 503. This process continues where each successive exterior connector requires the accessor to move a data storage media element a varying distance.

Figure 6A:
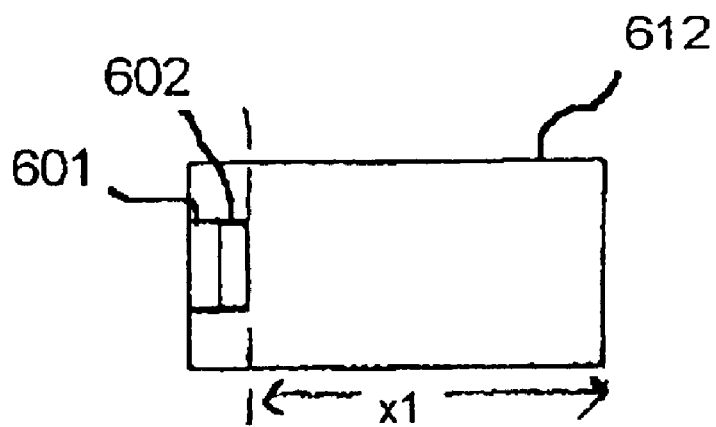
FIGS. 6A–6C are cutaway perspective views of a drive consistent with the invention illustrating the addition of exterior connectors on a stacked connector system while recessing the position of the interior connector relative to the drive as additional exterior connectors are added.
Figure 6B:
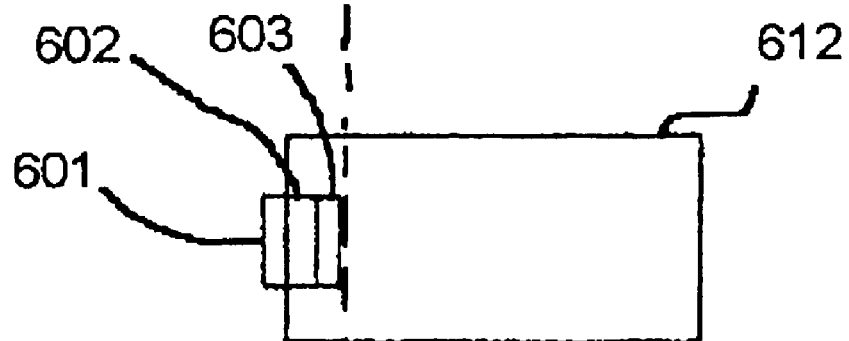
Figure 6C:
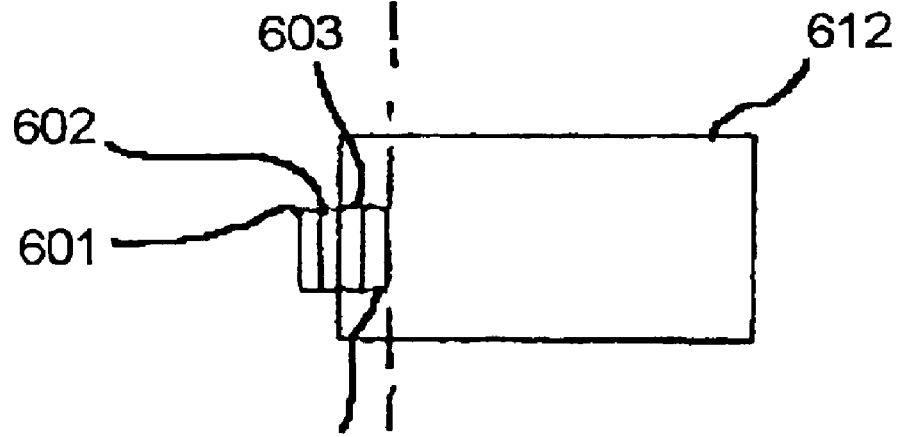

Turning to FIGS. 6A–6C, the stacked connector system may also be configured to recess into the drive 612 as connectors are added to alleviate the varying distances the accessor has to handle. As illustrated in FIG. 6A, the interior connector 601 and exterior connector 602 are stacked or coupled together. As detailed earlier with the preferred embodiment, the library control manager 124 keeps track of the state (expired or unexpired) of the connector 602.

Once the connector 602 enters its expired state, an unexpired connector 603 is coupled to the connector 602. The stacked connector system may then be configured to recess into the drive 612 such that the mating surface of connector 603 is the same distance x1 from the front of the drive 612 as was the prior exterior connector 602. Similarly, as illustrated in FIG. 6C, the stacked connector system is configured to recess further into the drive such that when an additional exterior connector 604 is coupled to connector 603, the distance from the mating surface of connector 604 is the same distance x1 from the front of the drive 612. Such a recess method may be used as an alterative to, or in conjunction with, the earlier embodiment of FIGS. 5A–5C.

Figure 7:
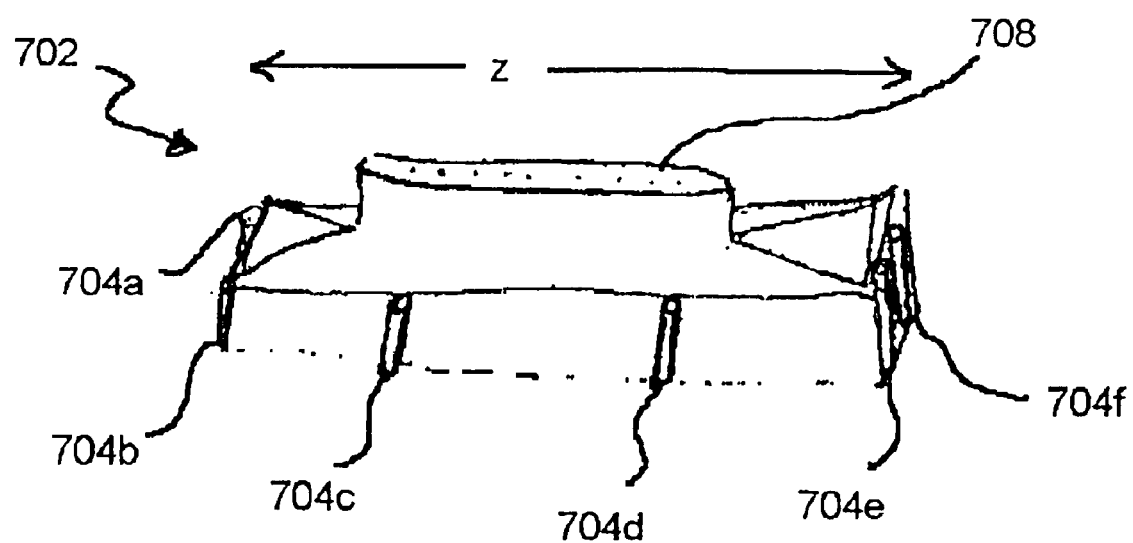
FIG. 7 is an exemplary connector consistent with the invention having a plurality of slots for assisting with alignment of successive connectors.

Turning to FIG. 7, an exemplary connector 702 having a plurality of slots 704a–704f for assisting with alignment is illustrated. In a stacked connector system consistent with the invention, alignment of successive connectors for coupling to each other should be addressed to ensure proper and consistent mating of adjacent connectors. As such, an exemplary connector 702 may have a width z that is substantially equal to the width of the drive so that the walls of the drive will serve to guide and align the connector 702 for mating with another connector in a stacked connector system. In addition, a plurality of alignment slots 704a–704f may be provided along the perimeter of the connector 702. When each connector in the stacked connector system is equipped with such alignment slots, mating of the slots of one connector with the slots of an adjacent connector serve to also align the multi-pin connector portion 708 of each respective connector.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An automated data storage library comprising:
   a plurality of storage slots;
   a drive having a stacked connector system;
   a plurality of data storage media elements stored in at least some of said plurality of storage slots, wherein each of said plurality of data storage media elements has a media connector;
   an accessor configured to transport said data storage media elements between said storage slots and said drive; and
   a library control manager coupled to said drive and to said accessor, wherein said library control manager is configured to monitor usage data for said stacked connector system representative of the number of times said stacked connector system is mounted by any of said media connectors from any of said plurality of media elements, and wherein said library manager is further configured to coordinate refreshment of said stacked connector system when said usage data reaches a predetermined usage level threshold.

2. The automated data storage library of claim 1, wherein said stacked connector system comprises an interior connector fixed to said drive and an exterior connector coupled to said interior connector, wherein said refreshment of said stacked connector system is replacement of said exterior connector once said exterior connector reaches said predetermined usage level threshold.

3. The automated data storage library of claim 2, wherein said replacement of said exterior connector includes removal of said exterior connector and insertion of a first exterior connector for coupling to said interior connector, wherein said first exterior connector is in either an expired state or an unexpired state, wherein said expired state occurs when said usage data reaches a first predetermined usage level associated with said first exterior connector, wherein said insertion of said first exterior connector for coupling to said interior connector occurs when said first exterior connector is in said unexpired state.

4. The automated data storage library of claim 2, wherein said plurality of data storage media elements comprises a connector removal media element configured to remove said exterior connector once said exterior connector reaches said predetermined usage level threshold.

5. The automated data storage library of claim 4, wherein said plurality of data storage media elements comprises a connector insertion media element configured to insert a first exterior connector after removal of said exterior connector by said connector removal media element, wherein said first exterior connector is in either an expired state or an unexpired state, wherein said expired state of said first exterior connector occurs when said usage data reaches a first predetermined usage level associated with said first exterior connector, wherein said first exterior connector is in said unexpired state of said first exterior connector when transported to said drive by said connector insertion media element.

6. The automated data storage library of claim 5, wherein said library control manager instructs said accessor to transport said connector removal media element to said drive to remove said exterior connector once said exterior connector reaches said expired state associated with said exterior connector, and wherein said library controller then instructs said accessor to transport said connector insertion media element to said drive to insert said first exterior connector, wherein said first exterior connector is in either an expired state or an unexpired state, wherein said expired state of said first exterior connector occurs when said usage data reaches a first predetermined usage level associated with said first exterior connector, wherein said first exterior connector is in said unexpired state of said first exterior connector when transported to said drive by said connector insertion media element.

7. The automated data storage library of claim 1, wherein said stacked connector system comprises an interior connector coupled to said drive and an exterior connector coupled to said interior connector, wherein said exterior connector has an expired state and an unexpired state, wherein said expired state occurs when said usage data reaches a predetermined usage level associated with said exterior connector, and otherwise said exterior connector is in its unexpired state, and wherein said refresh of said stacked connector system is the coupling of a first exterior connector to said exterior connector once said exterior connector reaches said expired state.

8. The automated data storage library of claim 7, wherein said interior connector is fixed relative to said drive.

9. The automated data storage library of claim 7, wherein said interior connector is configured to move relative to said drive as said first exterior connector is coupled to said exterior connector.

10. A method of improving the long term performance of a drive in a media library, wherein said drive has a first connector having a first predetermined usage level, comprising the steps of:
coupling a second connector, having a second predetermined threshold usage level, to said first connector;
monitoring usage data of said second connector; and
replacing said second connector with a third connector having a third predetermined usage level once said usage data for said second connector reaches said second predetermined usage level.

11. The method of claim 10, further comprising the steps of:
monitoring usage data of said third connector;
replacing said third connector with a fourth connector once said usage data for said third connector reaches said third predetermined usage level.

12. The method of claim 11, wherein replacing of successive connectors continues until usage data for said first connector reaches said first predetermined usage level.

13. The method of claim 10, further comprising the steps of:
storing said usage data from said monitoring step; and
resetting said usage data to a reset level once usage data for said second connector reaches said second predetermined usage level.

14. The method of claim 10, further comprising the step of:
aligning said third connector with said first connector.

15. A method of improving the long term performance of a drive in a media library, wherein said drive has a first connector with a first predetermined usage level, comprising the steps of:
monitoring usage data of said first connector; and
coupling a second connector having a second predetermined usage level to said first connector once said usage data for said first connector reaches said first predetermined usage level.

16. The method of claim 15, further comprising the step of:
monitoring usage data of said second connector, and
coupling a third connector having a third predetermined usage level to said second connector once said usage data for said second connector reaches said second predetermined usage level.

17. The method of claim 15, further comprising the step of:
fixing said first connector to said drive.

18. The method of claim 15, further comprising the step of:
shifting the first connector relative to said drive an amount equal to a width of said second connector when said second connector is coupled to said first connector.

19. The method of claim 15, further comprising the step of:
aligning said third connector with said second connector.

20. A method of improving the long term performance of a drive in a media library comprising the steps of:
monitoring the number of times a media connector of a storage media element is mounted to a connector of said drive; and
replacing said connector once said number of mounts reaches a predetermined usage level over which said connector is more prone to failure.

21. An automated data storage library comprising:
a plurality of storage slots;
a drive having a stacked connector system;
a plurality of data storage media elements stored in at least some of said plurality of storage slots, wherein each of said plurality of data storage media elements has a media connector;
an accessor configured to transport said data storage media elements between said storage slots and said drive; and
a library control manager coupled to said drive and to said accessor, wherein said library control manager is configured to coordinate refreshment of said stacked connector system after a predetermined time interval.

* * * * *